United States Patent [19]

Reddy et al.

[11] Patent Number: 5,969,021

[45] Date of Patent: Oct. 19, 1999

[54] METHOD OF IMPROVING CRYSTALLIZATION RATE AND TEMPERATURE OF SYNDIOTACTIC POLYPROPYLENE AND COMPOSITIONS AND PRODUCTS MADE THEREFROM

[75] Inventors: Baireddy Raghava Reddy, Edmond, Okla.; Sehyun Kim, Seoul, Rep. of Korea; Edwar S. Shamshoum, Houston, Tex.

[73] Assignee: Fina Technology, Inc., Dallas, Tex.

[21] Appl. No.: 08/910,974

[22] Filed: Aug. 7, 1997

[51] Int. Cl.⁶ ............... C08K 5/20; C08K 5/09; C08K 5/04; C08F 110/06

[52] U.S. Cl. .......... 524/229; 524/321; 524/400; 524/505; 526/351

[58] Field of Search ................. 524/505, 400, 524/321, 229; 526/351

[56] References Cited

U.S. PATENT DOCUMENTS

| | | | |
|---|---|---|---|
| 4,645,792 | 2/1987 | Chatterjee | 524/490 |
| 5,548,007 | 8/1996 | Asanuma et al. | 524/99 |

*Primary Examiner*—Kriellion S. Morgan
*Attorney, Agent, or Firm*—Jimmy D. Wheelington; J. M. Gilbreth; M. Norwood Cheairs

[57] ABSTRACT

Method of improving the crystallization rate and temperature of syndiotactic polypropylene by addition of at least one of polytetrafluoroethylene, sodium 2,2-methylene-bis-(4,6,di-tert-butylphenyl)phosphate)), pimellic acid, and calcium pimallate, and compositions and products made thereby.

17 Claims, 5 Drawing Sheets

METHOD OF IMPROVING CRYSTALLIZATION RATE AND TEMPERATURE OF SYNDIOTACTIC POLYPROPYLENE AND COMPOSITIONS AND PRODUCTS MADE THEREFROM

BACKGROUND OF THE INVENTION

1. Field of the Invention

The present invention relates to methods of treating syndiotactic polypropylene, treated syndiotactic polypropylene, and to products made thereof. In another aspect, the present invention relates to methods of treating syndiotactic polypropylene to improve the crystallization rate and temperature, to syndiotactic polypropylene compositions having improved crystallization rate and temperature, and to products made thereof. In even another aspect, the present invention relates to methods of increasing the cell II (low melting form) structure content of syndiotactic polypropylene, to syndiotactic polypropylene compositions having increased content of cell II (low melting form) structure, and to products made thereof.

2. Description of the Related Art

Polypropylene has long been known to exist in several forms. Generally, isotactic propylene (iPP) can be described as having the methyl groups attached to the tertiary carbon atoms of successive monomeric units on the same side of a hypothetical plane through the polymer chain, whereas syndiotactic polypropylene (sPP) may generally be described as having the methyl groups attached on alternating sides of the polymer chain.

More specifically, the isotactic structure is typically described as having the methyl groups attached to the tertiary carbon atoms of successive monomeric units on the same side of a hypothetical plane through the main chain of the polymer, e.g., the methyl groups are all above or all below the plane. Using the Fischer projection formula, the stereochemical sequence of isotactic polypropylene is described as follows:

Another way of describing the structure is through the use of NMR spectroscopy. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

Syndiotactic polymers, in contrast to the isotactic structure, are those in which the methyl groups attached to the tertiary carbon atoms of successive monomeric units in the chain lie on alternate sides of the plane of the polymer. Using the Fischer projection formula, the structure of a syndiotactic polymer is designated as:

In NMR nomenclature, this pentad is described as . . . rrrr . . . in which each "r" represents a "racemic" dyad, i.e., successive methyl group on alternate sides of the plane. The percentage of r dyads in the chain determines the degree of syndiotacticity of the polymer. Syndiotactic polymers are crystalline and, like the isotactic polymers, are insoluble in xylene. This crystallinity distinguishes both syndiotactic and isotactic polymers from an atactic polymer which is soluble in xylene. Atactic polymer exhibits no regular order of repeating unit configurations in the polymer chain and forms essentially a waxy product.

Clarity, toughness and elasticity are some of the extraordinary advantages offered by syndiotactic polypropylene over some other semi-crystalline polyolefins such as isotactic polypropylene.

However, the full potential of syndiotactic polypropylene, either in the unstabilized form or the stabilized form against degradation, cannot be realized due to problems associated with low crystallization rates and low crystallization temperatures.

While the heat of crystallization of a commercially produced isotactic polypropylene is about 100 Joules per gram, the heat of crystallization of syndiotactic polypropylene with greater than about 70 per cent racemic pentad, is only about 30 to about 50 Joules per gram. Thus, sPP retains less crystallinity than iPP. The crystallization rate of sPP is significantly slower than iPP. The sPP continues to crystallize even after pelletization during the continuous operation. Low crystallization temperatures ($T_c$) also require cooling of injection molded parts or extruded films or sheets to much lower temperatures than needed, for example, for isotactic polypropylene. This results in slower production rates and increased energy costs.

In addition, syndiotactic polypropylene has been shown to exhibit polymorphism, as described, for example in A. J. Lovinger et al., "Morphology and Thermal Properties of Fully Snydiotactic Polypropylene", Macromolecules, 27, 6603–6611 (1994). X-ray diffraction data, electron diffraction data, and DSC ("Differential Scanning Calorimeter") curves, all have shown that the crystal structure of syndiotactic polypropylene may contain right handed helices along the "a" and "b" crystallographic axes, in which case the type of structure is denoted "cell I" type. A "cell II" (or low melting form) type structure contains anti-chiral helices along "a" crystallographic axis and chiral helices along "b" crystallographic axes. "Cell III" (or high melting form) type of syndiotactic polypropylene structure contains anti-chiral helices along both "a" and "b" crystallographic axes. Correlation of DSC melting peaks with the x-ray and electron diffraction results show that cell II (low melting form) type structure corresponds to the lower melting peak in DSC, whereas cell III (high melting form) type structure corresponds to the higher melting peak of syndiotactic polypropylene. In almost all cases, a non-nucleated and non-annealed sample of syndiotactic polypropylene shows the presence of two melting peaks by DSC. Without being limited by theory, it is believed that cell II (low melting form) type structure is kinetically controlled and is formed at rapid rates, whereas cell III (high melting form) type structure is the thermodynamically more stable structure and is formed more slowly. Cell III (high melting form) type structures have also been shown by Lovinger, in the aforementioned reference, to be prone to development of microcracks.

Finally, not only does syndiotactic polypropylene have crystallization temperatures and rates that could be improved, some common processing additives, such as calcium stearate, tend to reduce the crystallization rate even more.

Thus, in spite of the advancements in the prior art relating to syndiotactic polypropylene, there is a need for a method of improving the crystallization rate and temperature of syndiotactic polypropylene.

There is another need in the art for a syndiotactic polypropylene having improved crystallization rate and temperature of syndiotactic polypropylene.

There is even another need in the art for products made from syndiotactic polypropylene having improved crystallization rate and temperature of syndiotactic polypropylene.

There is still another need in the art for methods of increasing the cell II (low melting form) content and decreasing the cell III (high melting form) content of syndiotactic polypropylene, and for such polymers and products made therefrom.

These and other needs in the art will become apparent to those of skill in the art upon review of this specification, including its drawings and claims.

SUMMARY OF THE INVENTION

It is an object of the present invention to provide for a method of improving the crystallization rate and temperature of syndiotactic polypropylene.

It is another object of the present invention to provide for a syndiotactic polypropylene having improved crystallization rate and temperature of syndiotactic polypropylene.

It is even another object of the present invention to provide for products made from syndiotactic polypropylene having improved crystallization rate and temperature of syndiotactic polypropylene.

It is still another object of the present invention to provide for methods of increasing the cell II (low melting form) content and decreasing the cell III (high melting form) content of syndiotactic polypropylene, and for such polymers and products made therefrom.

These and other objects of the present invention will become apparent to those of skill in the art upon review of this specification, including its drawings and claims.

A method of treating syndiotactic polypropylene comprising the step of contacting syndiotactic polypropylene with at least one selected from the group consisting of polytetrafluoroethylene, sodium 2,2-methylene-bis-(4,6,di-tert-butylphenyl)phosphate)), pimellic acid, calcium pimallate.

According to another embodiment of the present invention, there is provided a composition comprising syndiotactic polypropylene and at least one selected from the group consisting of polytetrafluoroethylene,sodium 2,2-methylene-bis-(4,6,di-tert-butylphenyl)phosphate)), pimellic acid, calcium pimallate.

According to another embodiment of the present invention, there is provided a composition comprising syndiotactic polypropylene having a crystallization temperature greater than about 67° C.

According to even another embodiment of the present invention, there is provided a syndiotactic polypropylene composition comprising at least 25 weight percent cell II (low melting form) type structure polypropylene, based on the total of weight of cell II (low melting form) structure and cell III (high melting form) type structure of syndiotactic polypropylene.

According to still another embodiment of the present invention, there is provided a method of forming a product. The method includes the step of heating a mixture comprising syndiotactic polypropylene and an additive above the melt temperature of the syndiotactic polypropylene to form a melted mixture, wherein the additive comprises at least one selected from the group consisting of polytetrafluoroethylene, NA-11, pimellic acid, calcium pimallate. The method also includes the step of forming the melted mixture into a desired shape. The method finally includes cooling the desired shape to below the melt temperature of the syndiotactic polypropylene.

DETAILED DESCRIPTION OF THE INVENTION

Figure 1:
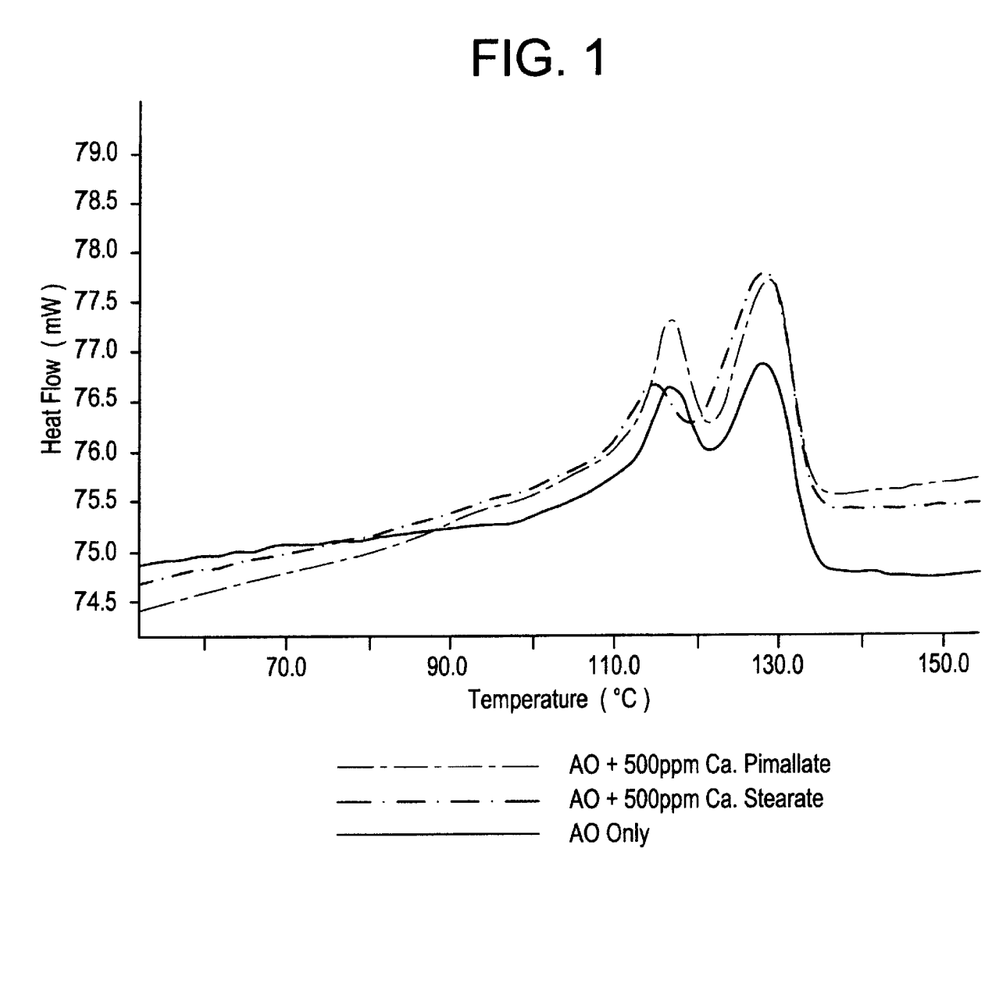
FIG. 1 is a DSC graph showing a comparison of the melting behavior of sPP-1 with stearate and pimallate salts of calcium.
Figure 2:
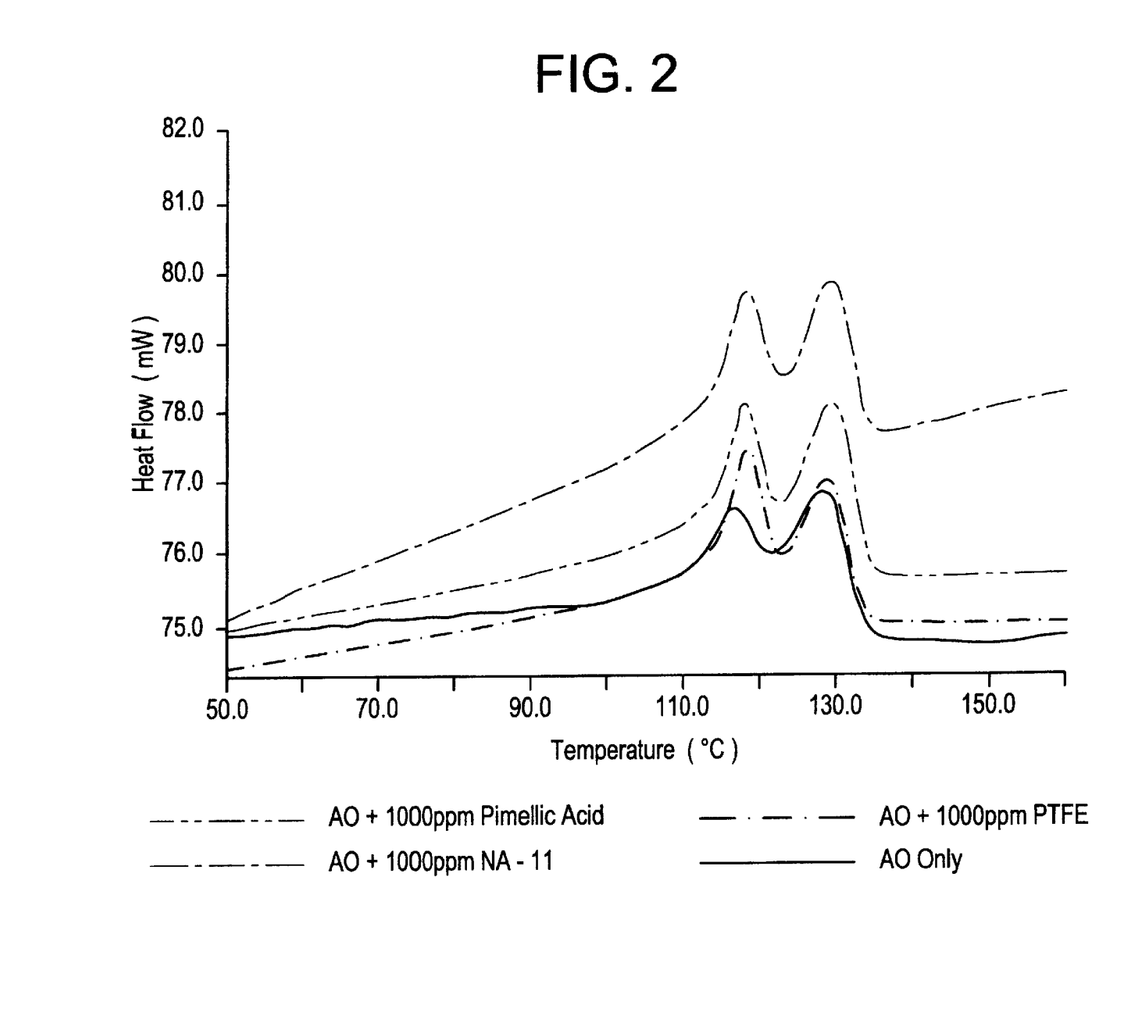
FIG. 2 is a DSC graph showing a comparison of the melting behavior of sPP-1 with PTFE, NA-11, and Pimellic Acid.
Figure 3:
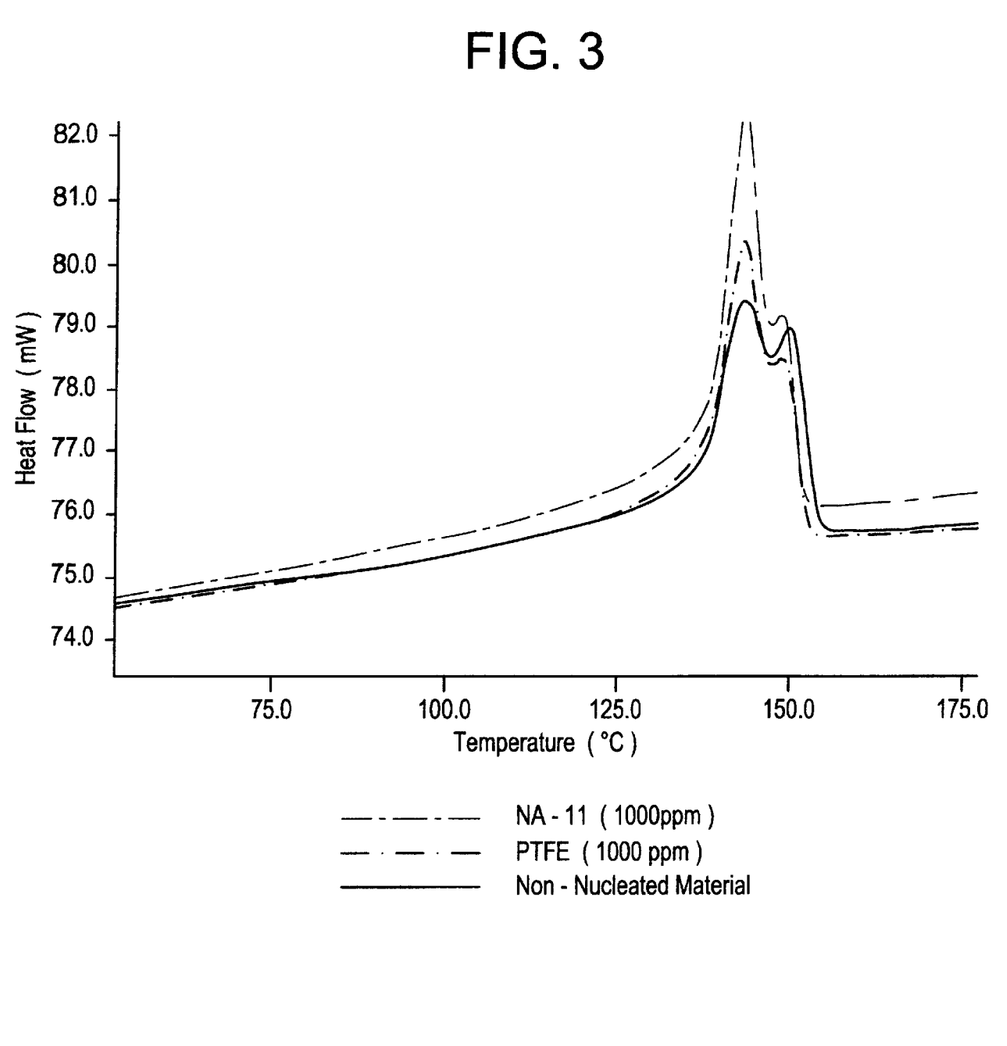
FIG. 3 is a DSC graph showing a comparison of the melting behavior of sPP-3 with PTFE, and NA-11.
Figure 4:
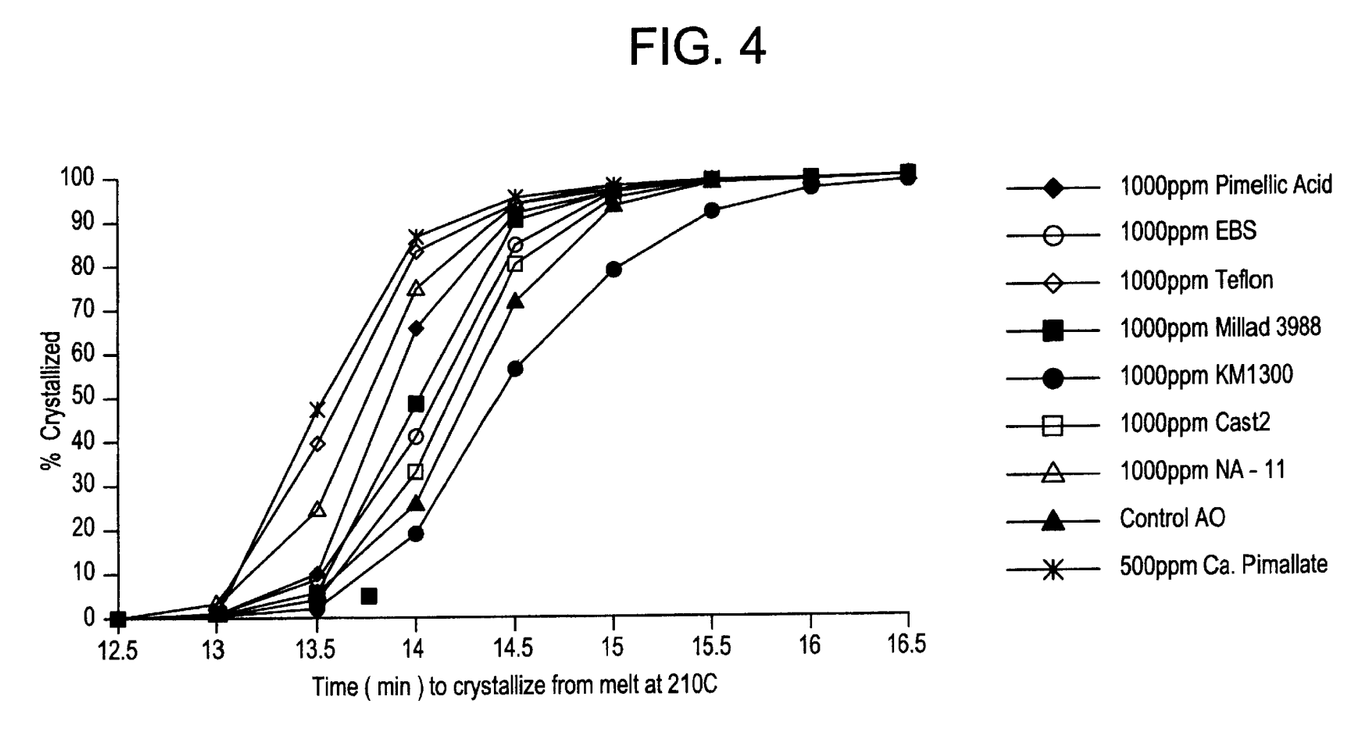
FIG. 4 is a graph showing a comparison of nucleation abilities of single nucleators as measured by the percent crystallized sPP content from the melt as a function of time
Figure 5:
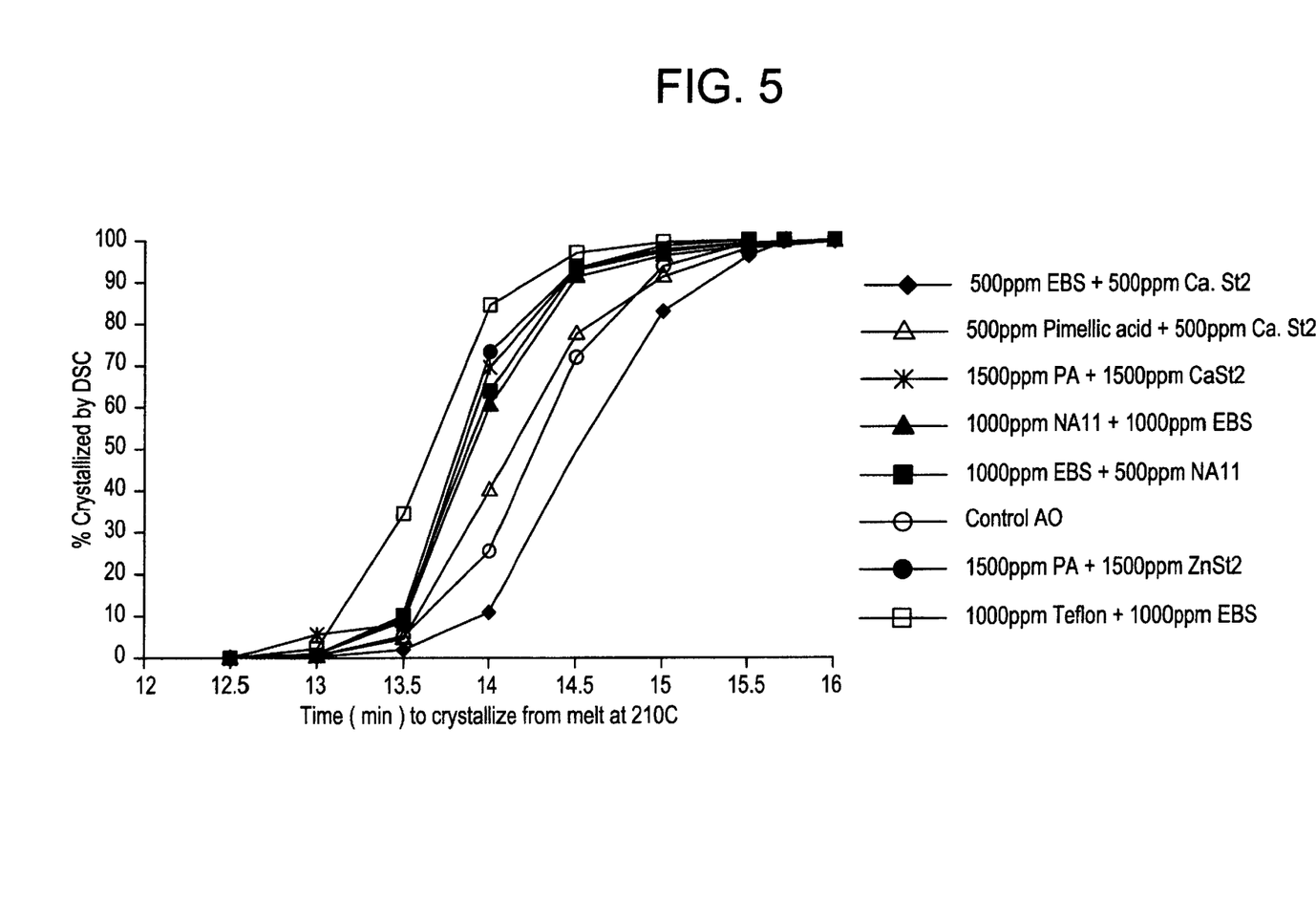
FIG. 5 is a graph showing a comparison of the nucleation abilities of two-component nucleator system measured by the percent crystallized sPP content from the melt as a function of time.

The composition of the present invention includes a syndiotactic polypropylene and a crystallization additive for increasing the crystallization rate and temperature of the syndiotactic polypropylene.

The syndiotactic polypropylene utilized in the present invention, and methods of making such a syndiotactic polypropylene, are well known to those of skill in the polyolefin art. An example of a suitable syndiotactic polypropylene and a method of its making can be found in U.S. Pat. Nos. 4,892,851, 5,334,677, and 5,476,914, all herein incorporated by reference.

Preferably, the syndiotactic polypropylene utilized in the present invention comprises tacticity of at least 70 percent rr dyads molecules as defined by the percent of rr dyads. More preferably, the syndiotactic polypropylene utilized in the present invention comprises tacticity of at least 80 percent rr dyads, even more preferably at least 83 percent rr dyads, and still more preferably at least about 90 percent rr dyads. Most preferably the syndiotactic polypropylene utilized in the present invention comprises substantially syndiotactic molecules.

The still more preferred syndiotactic polypropylenes utilized in the present invention generally comprise tacticity in the range of about 83 to about 95 percent rr dyads, more preferably in the range of about 85 to about 95 percent rr dyads, and most preferably in the range of about 89 to about 95 percent rr dyads.

The syndiotactic polypropylene useful in the present invention will generally be selected according to the desired end use of polypropylene, for compatibility with the additives, and for compatibility with the processing conditions, and with any other polymers to be added thereto. The molecular weight upper range for the syndiotactic polypropylene is generally dictated by the desired handling compatibility. The lower range is generally dictated by the desired end use of the blend.

As a non-limiting example, a suitable syndiotactic polypropylene which may be utilized in the present invention may generally be described as having a number molecular weight in the range of about 30000 to about 150000, a weight average molecular weight in the range of about 60000 to 350000, a melting point in the range of about 95° C. to about 165° C., a bulk density in the range of about 0.28 to about 0.55 g/cc, polymer density in the range of about 0.87 to 0.90 g/cc, polydispersity in the range of about 2 to about 5, and percent dyad and pentad value over 70 percent.

Crystallization additives useful in the present invention include polytetrafluoroethylene ("PTFEY"), pimellic acid, sodium 2,2-methylene-bis- (4,6,di-tert-butylphenyl) phosphate)), 3,4-dimethylbenzylidine sorbitol, calcium pimallate. Non-limiting commercially available products suitable for use in the practice of the present invention include Millad® 3988 (3,4-dimethylbenzylidine sorbitol), available from Milliken Chemicals, Teflon® (PTFE), available from DuPont, and NA-11-uy®, sodium 2,2-methylene-bis-(4,6,di-tert-butylphenyl)phosphate)), available from Asahi Denka Kogyo. In the practice of the present invention the preferred crystallization additives include polytetrafluoroethylene and NA-11, and the more preferred crystallization additive is polytetrafluoroethylene.

Where calcium stearate is or will be present in the syndiotactic polypropylene, it is preferred that calcium pimallate or pimellic acid be added to the syndiotactic polypropylene.

The crystallization additive may be added to the syndiotactic polypropylene during or after polymerization. Preferably, it is added to the syndiotactic polypropylene as it is being extruded through the extrusion die.

The crystallization additive is generally added to the syndiotactic polypropylene in an amount suitable to increase the crystallization rate and temperature. Generally in the range of about 100 to about 10,000 parts crystallization additive will be added per million parts of polypropylene. Preferably, in the range of about 500 to about 5,000 crystallization additive will be added per million parts of polypropylene, and more preferably in the range of about 800 to about 1500 crystallization additive will be added per million parts of polypropylene.

In the practice of the present invention, ethylene bissteara-mide (EBS) may be added to syndiotactic polypropylene to reduce product stickiness along with one or more of the crystallization additives discussed above. Generally, in the range of about 100 to about 3000 EBS will be added per million parts of polypropylene.

In the present invention, the syndiotactic polypropylene treated with the crystallization additive, will have a crystallization temperature that is improved as compared to the untreated syndiotactic polypropylene. Generally, the crystallization temperature of the treated syndiotactic polypropylene will be in the range of about 50° C. to about 120° C., preferably in the range of about 60° C. to about 110° C., and more preferably in the range of about 65° C. to about 105° C.

The syndiotactic polypropylene crystallized according to the present invention will also have an increased content of cell II (low melting form) structure and a decreased content of cell III (high melting form) structure as compared to the prior art syndiotactic polypropylenes.

Generally, the syndiotactic polypropylenes crystallized by the present invention will comprise in the range of about 20 weight percent to about 100 weight percent cell II (low melting form) type structure, based on the total weight of cell II and cell III type structures, preferably in the range of about 25 weight percent to about 90 weight percent cell II (low melting form) type structure, and more preferably in the range of about 30 weight percent to about 80 weight percent cell II (low melting form) type structure.

Generally, for the syndiotactic polypropylene crystalized by the present invention, the weight ratio of cell II (low melting form) type structure to cell III (high melting form) type structure will be in the range of about 1:4 to about 1:0, preferably in the range of about 1:3 to about 9:1, and more preferably in the range of about 3:7 to about 4:1.

The syndiotactic polypropylene compositions of the present invention may also contain conventional ingredients as are known to those of skill in the art. Non-limiting examples of such conventional ingredients include anti-blocking agents, antistatic agents, antioxidants, blowing agents, crystallization aids, dyes, flame retardants, fillers, impact modifiers, mold release agents, oils, other polymers, pigments, processing agents, reinforcing agents, stabilizers, UV resistance agents, and the like.

Non-limiting examples of reinforcing agents include inorganic or organic products of high molecular weight, including glass fiber, asbestos, boron fibers, carbon and graphite fibers, whiskers, quartz and silica fibers, and synthetic organic fibers.

When such conventional ingredients are utilized, they will generally be present in a range from about 0.01 to about 50 weight percent of the blend, preferably in a range from about 1 to about 25 weight percent of the blend.

EXAMPLES

The following Examples are provided merely to illustrate selected embodiments of the present invention and do not limit the scope of the claims.

Base Polymers

Polymer sPP-1 is a syndiotactic polypropylene with a polydispersity of 2.5, D' of 2.01, Mw and Mn of the closest material of 132300 and 52800, respectively, fluff melt flow rate (MFR) of 4.00 g/10 min., 2.9% Xylene solubles, and with tacticity data as follows: mmmm, 3.07; mmmr, 0.51; rmmr, 2.46, mmrr, 4.68; xmrx, 3.51; rmrm, 1.68; rrrr, 76.02; rrrm, 7.7; mrrm, 0.37.

The fluff containing 50 ppm Irganox® 1076 {Ciba-Geigy, Octadecyl 3,5, di-tert-butyl-4-hydroxyhydrocinnamate} was compounded with an antioxidant package containing 1000 ppm Irganox® 1010 {Ciba Geigy, tetrakis-(methylene[3,5-di-tert-butyl-4-hydroxyhydrocinnamate]methane)} and 500 ppm Irgafos® 168 {Ciba Geigy, tris-(2,4-di-tert-butylphenyl)phosphite}, as well as with the desired crystallization additive(s) with or without ethylene bis-stearate according to Table I and Table II. The compounded fluff was shaken thoroughly and extruded on a RandCastle microextruder into strands. The strands were cooled to room temperature and pelletized using a laboratory pelletizer. Extrusion conditions were as follows: Zone 1, 370° F., Zone 2, 415° F., Zone 3, 435° F., and Zone 4 (die), 455° F. A screw speed of 16.4 rpm was generally used. Each formulation was approximately 200 grams.

Results are presented in the following Tables I and II.

Polymer sPP-3 is a highly syndiotactic polypropylene with rrrr content of 91%, Tc of 91.8° C., Tm of 143.4° C. and 138.7° C. The tacticity data is a follows: mmmm, 0.0; mmmr, 0.0; rmmr, 1.39; mmrr, 2.41; xmrx, 0.90; mrmr, 0.87; rrrr 91.1; rrrm, 2.92; mrrm, 0.40.

Polymer processing was as described in Example 1 above, except that Zone 3 temperature was 425° F., Zone 4 temperature was 440° F., and the screw speed was 12 rpm.

Results are presented in the following Table I.

TABLE I

MELTING AND CRYSTALLIZATION PROPERTIES OF SYNDIOTACTIC POLYPROPYLENE MELT BLENDED WITH VARIOUS ADDITIVES

| Formulation | $T_{m2}$, °C. (Note 1) | $\delta HT_m$, J/g | Onset, °C. | $T_c$, Peak, °C. (Note 2) | $\delta H(T_c)$, J/g | On set, °C. | % Low Melting form (or % Cell II) (Note 3) |
|---|---|---|---|---|---|---|---|
| sPP-1 (Fluff-unstablized) | 126.0 | 37.41 | 102.9 | 69.1 | 12.78 | 78.5 | |
| sPP-1 Std AO(500 ppm I-1010 + 1000 ppm 1–168) | 128.2 | 37.71 | 118.14 | 67.24 | 29.17 | 74.38 | 40 |
| sPP-1 + AO + 100 ppm Ca. Stearate | 127.6 | 35.99 | 121.0 | 65.9 | 29.58 | 72.7 | |
| sPP-1 + AO + 500 ppm Ca. Stearate | 127.9 | 38.99 | 117.6 | 65.9 | 32.01 | 73.8 | 25 |
| sPP-1 + AO + 1000 ppm Ca. Stearate | 128.1 | 38.74 | 122.3 | 68.6 | 30.31 | 75.3 | |
| sPP-1 + AO + 1500 ppm Ca. Stearate | 127.4 | 37.2 | 117.4 | 65.2 | 29.8 | 72.9 | |
| sPP-1 + AO + 500 ppm Ca. Pimallate | 128.7 | 37.38 | 122.5 | 69.5 | 30.68 | 75.3 | 36 |
| sPP-1 AO + 1000 ppm Pimellic Acid | 129.5 | 38.02 | 123.7 | 72.2 | 29.55 | 77.1 | 40 |
| sPP-1 + AO + 1000 ppm NA-1I | 129.2 | 38.67 | 111.2 | 72.2 | 29.86 | 79.7 | 47 |
| sPP-1 + AO + 1000 ppm EBS | 129.9 | 38.91 | 124.2 | 68.6 | 28.89 | 77.2 | |
| SPP-1 + AO + 1000 ppm Millad 3988 | 128.4 | 37.43 | 121.6 | 70.0 | 28.09 | 74.9 | |
| sPP-1 + AO + 1000 ppm KM 1300 | 127.5 | 38.58 | 120.6 | 68.6 | 29.24 | 74.0 | |
| sPP-1 + AO + 1000 ppm PTFE | | 40 | 112.3 | 74.0 | 30.02 | 80.4 | 49 |
| sPP-3 + AO + 1000 ppm PTFE | 143.3 | 52.42 | 136.8 | 95.8 | 44.73 | 99.4 | 63 |
| sPP-3 + AO + 1000 ppm NA-11 | 143.4 | 54.99 | 137.8 | 96.2 | 46.81 | 100 | 66 |
| sPP-3 Pellets + AO | 143.4 | 54.04 | 136.1 | 91.8 | 43.57 | 96.8 | 58 |

Note 1: Denotes the value of the higher melting peak as seen in the DSC (Differential Scanning Calorimeter)
Note 2: Temperature of the Crystallization Peak as measured by DSC.
Note 3: The two melting peaks in the DSC were triangulated by extrapolation of the unresolved portion onto a common baseline. The triangular areas were cut and weighed. The weight of the lower melting form is divided by the sum of the weights of both triangular areas and the resulting number was multiplied by 100.

TABLE II

MELTING AND CRYSTALLIZATION PROPERTIES OF SYNDIOTACTIC POLYPROPYLENE MELT BLENDED WITH VARIOUS ADDITIVE COMBINATIONS

| Formulation | $T_{m2}$, °C. (Note 1) | $\delta HT_m$, J/g | Onset, °C. | $T_c$, Peak, °C. (Note 2) | $\delta H(T_c)$, J/g | On set, °C. |
|---|---|---|---|---|---|---|
| sPP-1 (Fluff-unstablized) | 126.0 | 37.41 | 102.9 | 69.1 | 12.78 | 78.5 |
| sPP-1 Std AO(500 ppm I-1010 + 1000 ppm 1–168) | 128.2 | 37.71 | 118.1 | 67.2 | 29.17 | 74.4 |
| sPP-I + AO + 500 ppm Pimellic Acid + 500 ppm Ca. Stearate | 127.8 | 40.01 | 122.1 | 70.3 | 30.39 | 75.4 |
| sPP-1 + AO + 500 ppm EBS + 500 ppm Ca. Stearate | 128.1 | 37.91 | 117.7 | 65.3 | 28.81 | 72.6 |
| sPP-I + AO + 1500 ppm Pimellic Acid + 1500 ppm Ca. Stearate | 128.6 | 38.72 | 111.8 | 71.7 | 29.66 | 75.9 |
| sPP-1 + AO + 1500 ppm Pimellic Acid + 1500 ppm Zinc Stearate | 128.3 | 38.3 | 111.7 | 72.0 | 29.72 | 76.2 |
| sPP-1 + AO + 500 ppm NA-11 + 1000 ppm EBS | 129.6 | 40.25 | 124.2 | 71.2 | 28.94 | 76.2 |
| sPP-I + AO + 1000 ppm NA-11 + 1000 ppm EBS | 128.3 | 37.97 | 122.0 | 70.9 | 30.79 | 76.5 |
| sPP-1 + AO + 1000 ppm PTFE + 1000 ppm EBS | 130.6 | 38.075 | 113.4 | 74.2 | 28.15 | 79.7 |
| sPP-1 + AO + 500 ppm NA-11 + 1000 ppm Pimellic Acid | 128.3 | 39.13 | 121.1 | 69.5 | 30.69 | 74.7 |

Note 1: Denotes the value of the higher melting peak as seen in the DSC (Differential Scanning Calorimeter)
Note 2: Temperature of the Crystallization Peak as measured by DSC.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A method of treating syndiotactic polypropylene comprising the step of contacting syndiotactic polypropylene with at least one additive selected from the group consisting of polytetrafluoroethylene, pimellic acid, and calcium pimallate.

2. The method of claim 1 wherein the additive comprises in the range of about 100 parts to about 10,000 parts per million parts of the syndiotactic polypropylene.

3. The method of claim 1 wherein the additive further comprises ethylene bis stearamide.

4. The method of claim 1 wherein the additive is selected from among polytetrafluoroethylene.

5. The method of claim 4 wherein the additive comprises in the range of about 800 parts to about 1500 parts per million parts of the syndiotactic polypropylene.

6. A composition comprising syndiotactic polypropylene and at least one additive selected from the group consisting of polytetrafluoroethylene, pimellic acid, and calcium pimallate.

7. The composition of claim 6 wherein the additive comprises in the range of about 100 parts to about 10,000 parts per million parts of the syndiotactic polypropylene.

8. The composition of claim 1 wherein the additive further comprises ethylene bis stearamide.

9. The composition of claim 1 wherein the additive is polytetrafluoroethylene.

10. The composition of claim 9 wherein the additive comprises in the range of about 800 parts to about 1500 parts per million parts of the syndiotactic polypropylene.

11. A composition comprising syndiotactic polypropylene having a crystallization temperature in the range of about 50° C. to about 120° C.

12. A syndiotactic polypropylene composition comprising in the range of about 20 to about 100 weight percent cell II type structure polypropylene, based on the weight total of cell II structure and cell III type structure of syndiotactic polypropylene.

13. A method of forming a product comprising the steps of:
   (a) heating a mixture comprising syndiotactic polypropylene and an additive above the melt temperature of the syndiotactic polypropylene to form a melted mixture, wherein the additive comprises at least one selected from the group consisting of polytetrafluoroethylene, and calcium pimallate;
   (b) forming the melted mixture into a desired shape; and
   (c) cooling the desired shape to below the melt temperature of the syndiotactic polypropylene.

14. The method of claim 13 wherein the additive comprises in the range of about 500 parts to about 5,000 parts per million parts of the syndiotactic polypropylene.

15. The method of claim 13 wherein the additive further comprises ethylene bis stearamide.

16. The method of claim 13 wherein the additive is polytetrafluoroethylene.

17. The method of claim 16 wherein the additive comprises in the range of about 800 parts to about 1500 parts per million parts of the syndiotactic polypropylene.

* * * * *